United States Patent
Hung et al.

(10) Patent No.: US 6,389,123 B1
(45) Date of Patent: May 14, 2002

(54) DECREASED-SIZE REPRESENTATION EMPLOYED WITH PORTION OF AUTOMATED NUMBER IDENTIFICATION INFORMATION IN DETERMINATION OF NETWORK CONTROL POINT ADDRESS

(75) Inventors: Hai Lung Hung, Woodridge; Karen Lyn Woest, Elk Grove Village, both of IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/436,941

(22) Filed: Nov. 8, 1999

(51) Int. Cl.[7] ............................................. H04M 15/00
(52) U.S. Cl. ......................... 379/127.01; 379/207.15; 379/221.14
(58) Field of Search ........................ 379/120, 127.01, 379/133–134, 142.01, 142.04, 142.06, 142.1, 201.01, 207.14, 219, 220.01, 222, 229, 230, 231, 207.15, 221.14, 245; 455/445, 432–433, 434, 436, 438–439, 440

(56) References Cited

U.S. PATENT DOCUMENTS 5,878,113 A * 3/1999 Bhusri
6,002,759 A * 12/1999 Kallioniemi et al.

* cited by examiner

Primary Examiner—Duc Nguyen
(74) Attorney, Agent, or Firm—Robert J. Brill; Grossman, Patti & Brill (57) ABSTRACT

A representation is determined from a first portion of automated number identification information. The representation has a decreased size relative to the first portion of the automated number identification information. The representation is employed with a second portion of the automated number identification information to determine a network control point address. The network control point address stores information related to call handling. In one example, a first stage component determines the representation, and a second stage component determines the network control point address.

52 Claims, 6 Drawing Sheets

DECREASED-SIZE REPRESENTATION EMPLOYED WITH PORTION OF AUTOMATED NUMBER IDENTIFICATION INFORMATION IN DETERMINATION OF NETWORK CONTROL POINT ADDRESS

TECHNICAL FIELD

This invention relates generally to communications information and more particularly to determination of call information.

BACKGROUND OF THE INVENTION

A long-distance network commonly employs network control points ("NCPs") in storing information concerning the handling of calls. Global title translation ("GTT") allows mapping of called and calling numbers to the correct NCPs, such as for determination of services to be provided in conjunction with particular calls. GTT is usually performed in real time during every call setup. So, the look-up in GTT has severe time constraints on its execution.

Typically, GTT executes on satellite processors within a long-distance switch. However, many long-distance switches have significant constraints on RAM memory.

Furthermore, the range of valid called and calling numbers is potentially very large. So, the capacity for the GTT database taxes available memory. Moreover, it is desirable to support efficient on-line provisioning of the GTT database, as well as capabilities for easy expansion.

SUMMARY OF THE INVENTION

Pursuant to the present invention, shortcomings of the existing art are overcome and additional advantages are provided through the provision of employment of a decreased-size representation of a first portion of automated number identification information with a second portion of the automated number identification information in determination of a network control point address.

The invention in one embodiment encompasses a method for determining from automated number identification information a network control point address that stores information related to call handling. A representation is determined from a first portion of automated number identification information. The representation has a decreased size relative to the first portion of the automated number identification information. The representation is employed with a second portion of the automated number identification information to determine the network control point address.

Another embodiment of the invention encompasses a system for determining from automated number identification information a network control point address that stores information related to call handling. The system includes a first stage component and a second stage component. The first stage component determines from a first portion of the automated number identification information a representation having a decreased size relative to the first portion of the automated number identification information. The second stage component employs the representation with a second portion of the automated number identification information to determine the network control point address.

DETAILED DESCRIPTION

In accordance with the principles of the present invention, a decreased-sized representation of a first portion of automated number identification information is employed with a second portion of the automated number identification information to determine a network control point address.

One example of the invention is described herein with reference to the figures. The invention, in one example, provides a number of advantages. One example of the invention supports very fast look-up and provisioning operations. Further, one example of the invention can provide a guaranteed level of performance under worst-case conditions. The invention, in one example, can employ advantageously very little RAM in providing storage for records of a database in a network such as global title translation ("GTT") network 100, as depicted in FIG. 1.

Figure 1:
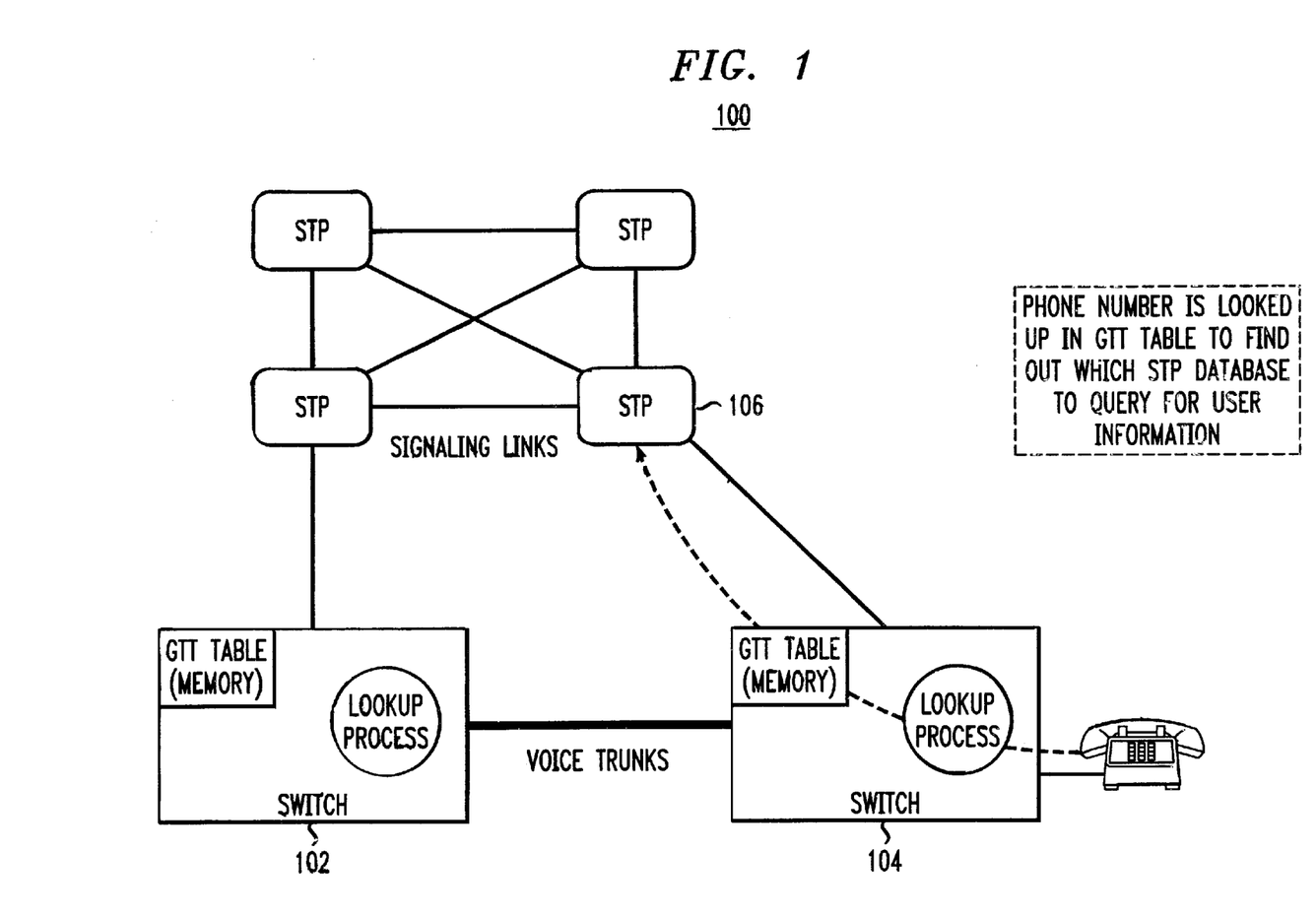
FIG. 1 depicts one example of a global title translation network.

As another advantage, referring to FIG. 1, the invention can consider called and calling number distributions at a number of switches such as switch 102 and switch 104. As detailed herein with reference to the figures, switch-specific, sparsely-populated portions of numbers can be compacted using a fast look-up procedure, for instance, as a first stage of GTT. As a second stage of the GTT, for example there can be employed a storage structure that desirably minimizes the portion of each number that needs to be retained in RAM as the total size of the storage structure increases. In addition, one example of the invention can allow insert and delete operations to be performed within nearly the same time as a look-up, to support efficient on-line provisioning of a large number of entries. In another example, a number of techniques can be employed to allow for expansion of the database.

A number of specialized services offered by the communications industry often require supplemental information concerning either a calling party or a called party, to properly route and set up a call between the calling party and the called party. As one advantage, the invention can provide enhanced storage and/or access to such supplemental information, such as for improved service in view of the trend toward a proliferation of such specialized services and/or customers. In one example, actual routing information for such services is stored in customer network databases located on network control points ("NCPs"). In another example, such customer databases as well as routing information include service indicators that list allowable and/or preferential customer treatment. For instance, as represented in FIG. 1, a message is sent by switch 104 to a point such as a signal transfer point ("STP") 106. For example, STP 106 can be local to switch 104. STP 106, in one example, uses information regarding to which NCP in network 100 the message should be routed.

Figure 4:
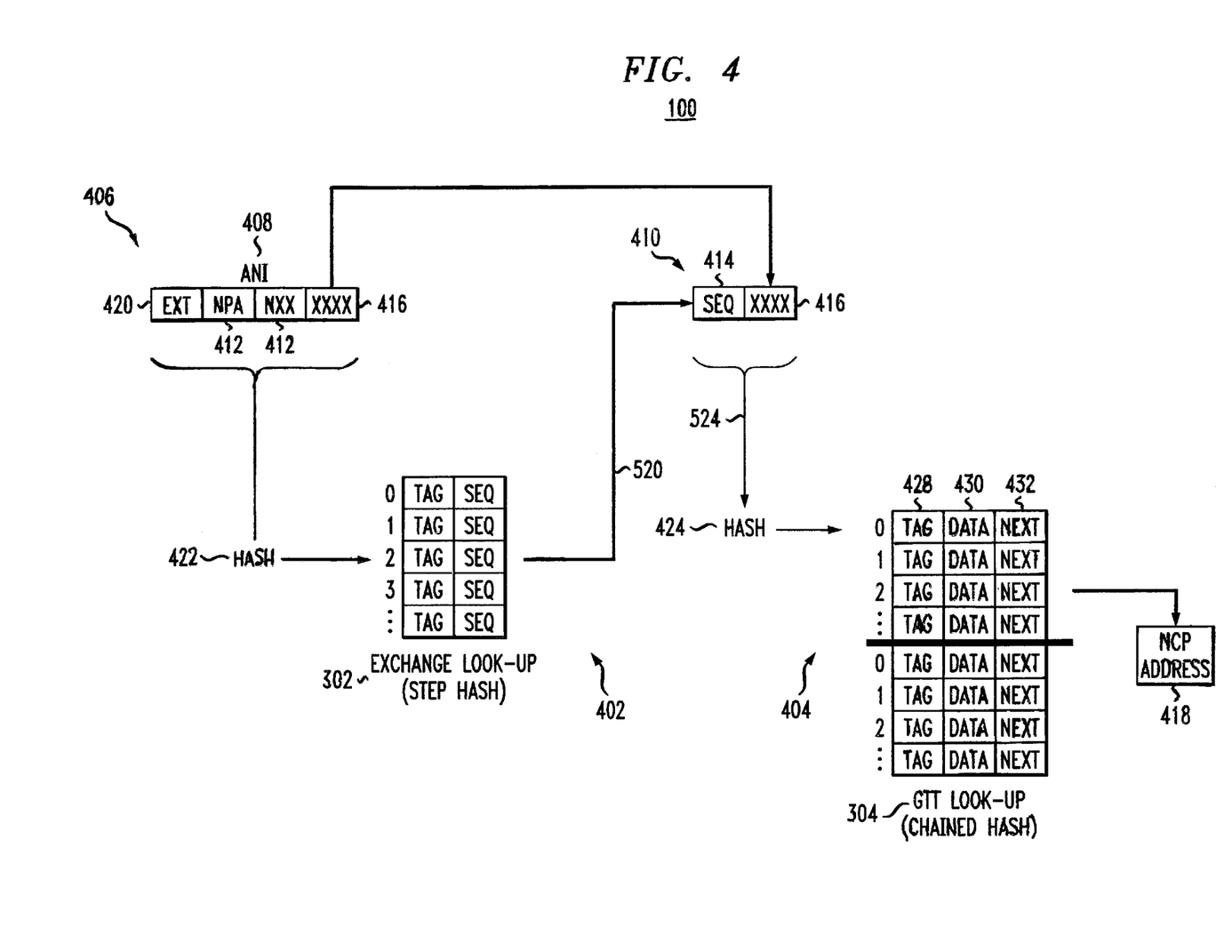
FIG. 4 depicts one example of employment of the first and second hash tables of FIG. 3 with automated number identification information.

Still referring to FIG. 1, switch 104 (e.g., in a satellite processor) in one example determines of an NCP address 418 (FIG. 4). For instance, switch 104 performs a digit translation of automated number identification ("ANI") information 408 (FIG. 4) into NCP address 418. For example, ANI information 408 can comprise a calling number or a called number. This function of translating ANI information 408 into the NCP address may be referred to as GTT. Post-dial delay can be decreased, for instance, by locating this functionality in a satellite processor of a long-distance switch, such as switch 104.

Further referring to FIG. 1, one example of the invention provides an efficient implementation for handling a large quantity of numbers and services. For instance, one implementation of the invention can meet a number of constraints. Illustrative constraints are now presented for exemplary purposes. For example, there is provided ANI manipulation. The ANI is formatted as NPA-NXX-XXXX where NPA-NXX comprises an exchange. One or more extended services types are associated with the exchange, as will be understood by those skilled in the art. For instance, there may be up to eight extended service types. For the ANIs and the extended services types are often associated with the exchange of the ANI, there are provided look-ups, insertions, and deletions.

As another exemplary constraint, there is provided fast average access. A few tens of milliseconds are allocated for completion of processing. A number of milliseconds are allocated for the actual look-up. A further exemplary constraint is bounded look-up time. All look-ups are completed within a bounded time.

Yet another constraint is a large ANI population. The ANI space includes hundreds of millions of numbers. There can be over one million numbers with special services requiring storage. In one example, RAM is limited, so only a small number of bytes per record is available.

A still further exemplary constraint is fast insert and delete. To support on-line provisioning, there are provided speeds roughly comparable to look-ups. An additional exemplary constraint is expansion capability. There is provided relatively easy expansion while maintaining the performance characteristics. In one example, there is provided expansion without reloading of tables.

Figure 2:
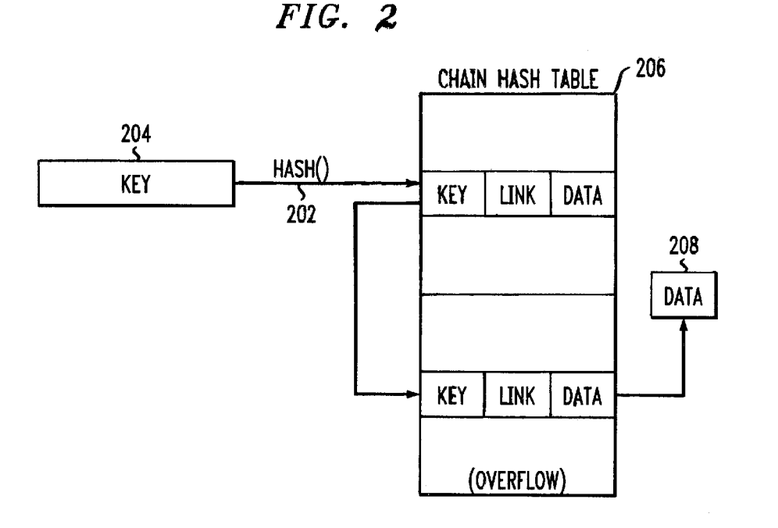
FIG. 2 depicts one example of employment of a chain hash table in the global title translation network of FIG. 1.

Turning to FIG. 2, a function such as hash function 202 employs key 204 to access a table such as chain hash table 206 for obtaining data 208. For instance, hash function 202 employs key 204 to locate data 208 in chain hash table 206, such as for a return of data 208 in response to a request to hash function 202, as will be understood by those skilled in the art.

Figure 3:
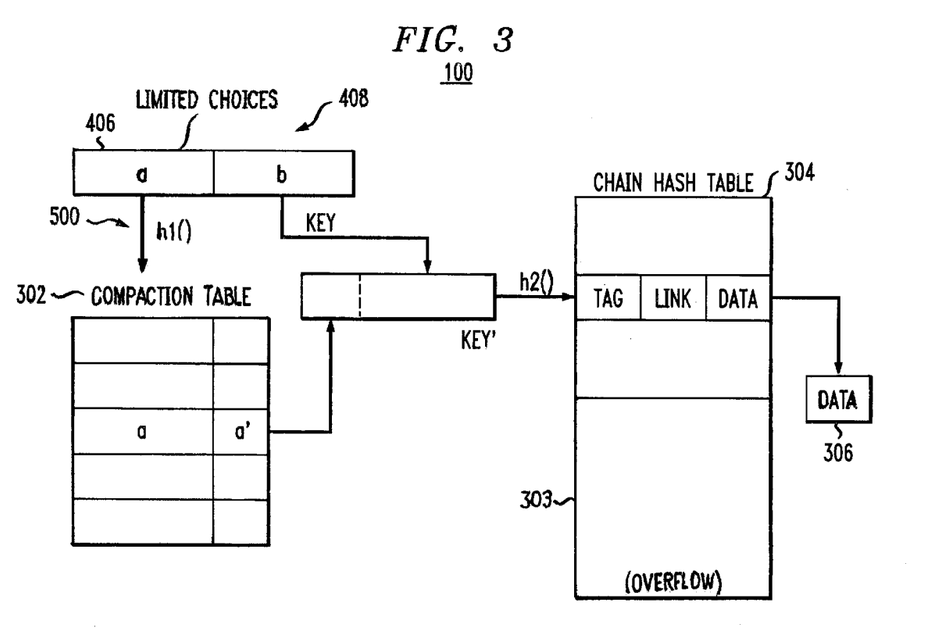
FIG. 3 depicts one example of employment of first and second hash tables in the global title translation network of FIG. 1.

Turning to FIG. 3, one example of GTT network 100 employs a plurality of tables such as compaction table 302 and chain hash table 304. For instance, employment of compaction table 302 and chain hash table 304 can advantageously serve to meet performance and/or resource constraints, such as for GTT translation of ANIs. For example, compaction table 302 and chain hash table 304 serve to allow execution of a multi-stage look-up process. In one example, compaction table 302 and chain hash table 304 are employed in an implementation of a two-stage look-up process that outputs data 306.

Turning to FIG. 4, in one example of operation of GTT network 100, first stage 402 employs first portion 406 of ANI information 408 to determine representation 410 having a decreased size relative to first portion 406. In one example of this function, first stage 402 verifies ANI exchange 412 and converts ANI exchange 412 into compact sequence number 414. As described herein, second stage 404 in one example of operation of GTT network 100, can employ representation 410 with second portion 416 of ANI information 408, to determine data 306 (FIG. 3) such as NCP address 418. As one example of this function, second stage 404 can combine compact sequence number 414 with second portion 416 of ANI information 408, and returns a GTT translation in NCP address 418. For instance, such as through implementation in computer software, a first component can comprise first stage 402 and a second component can comprise second stage 404.

Still referring to FIG. 4, first stage 402 in one example employs look-up table 302 to convert ANI exchange 412 into compact sequence number 414. For instance, this use of table 302 as a table separate from look-up table 304 can serve to provide an increased degree of compaction. In a further example, the look-up function of stage 402 can verify the information of first portion 406 of ANI information 408 as valid. In one example, first portion 406 includes service-related information 420 in first stage 402. For example, service-related information 420 comprises extended service types associated with the exchange information 412, as will be appreciated by those skilled in the art.

Again referring to FIG. 4, one example of first stage 402 searches table 302 until a match is found for first portion 406 of ANI information 408. For instance, the search by first stage 402 in table 302 can continue until a match is found in table 302 for ANI exchange 412 and service type 420. In the event no match is found, in one example, the resulting assumption is that no special service type of service-related information 420 exists for the particular instance of ANI exchange 412. In one example, most instances of ANI exchange 412 are limited to a single type of service type 420, so service-related information 420 is included in hash function 422. In a further example, the number of service type/exchange pairs is very small in comparison to the number of GTT records, so more than sufficient space in table 302 is available. In a still further example, speed is ensured through employment of a relatively simple step hash of table 302, as a relatively sparse table. For example, data sets from real switches may be employed as input to find a table size that provides an average number of probes of less than two, and that bounds a worst-case number of probes at five for all sets.

For exemplary purposes, below is presented a description of exemplary hash equations. The description employs operators that follow C programming language syntax, for explanatory purposes. The following operators are employed:

%—The percent symbol is used to represent the "modulus" operation.

^—The caret symbol represents the "bitwise logical exclusive or" operator.

&—The ampersand symbol represents the "bitwise logical and" operator.

<<—This symbol represents the "bitwise left shift" operator. The result is zero filled.

>>—This symbol represents the "bitwise right shift" operator. The result is assumed to be zero filled.

In one example, the initial hash value for compaction table 302 (FIG. 4) is $h_1 = (1000*NPA + NXX) \% T_1$, where $T_1$ is the size of the table. Successive probes are computed as $h_{i+1} = (h_i + c) \% T_1$, where c is a constant that is relatively prime to the table size. For instance, both the exchange and the extended service type must match for the search to terminate and return a sequence number.

In a further example, the operand to hash for look-up table 304 (FIG. 4) is op=10000*seq+XXXX, where seq is the sequence number returned from compaction table 302. For example, in a half-million entry table split between the initial hash portion and the overflow area, an appropriate hash function 424 for a twenty-six bit operand is $h_i$=op^ (op>>8)) & 0x03FFFF. The tag to be stored, in one example, is tag=op &0x 0FF. Checking the last eight bits of the operand, in one example, is sufficient to guarantee a match once a particular eighteen-bit index is chosen, since the operand can be uniquely regenerated by (x<<24^x<<16^x<<8^tag) &0x03FFFFFF, where x=$h_1$^tag. For instance, subsequent probes are determined from a link 432 (FIG. 4) stored in each record, as will be appreciated by those skilled in the art.

Figure 5:
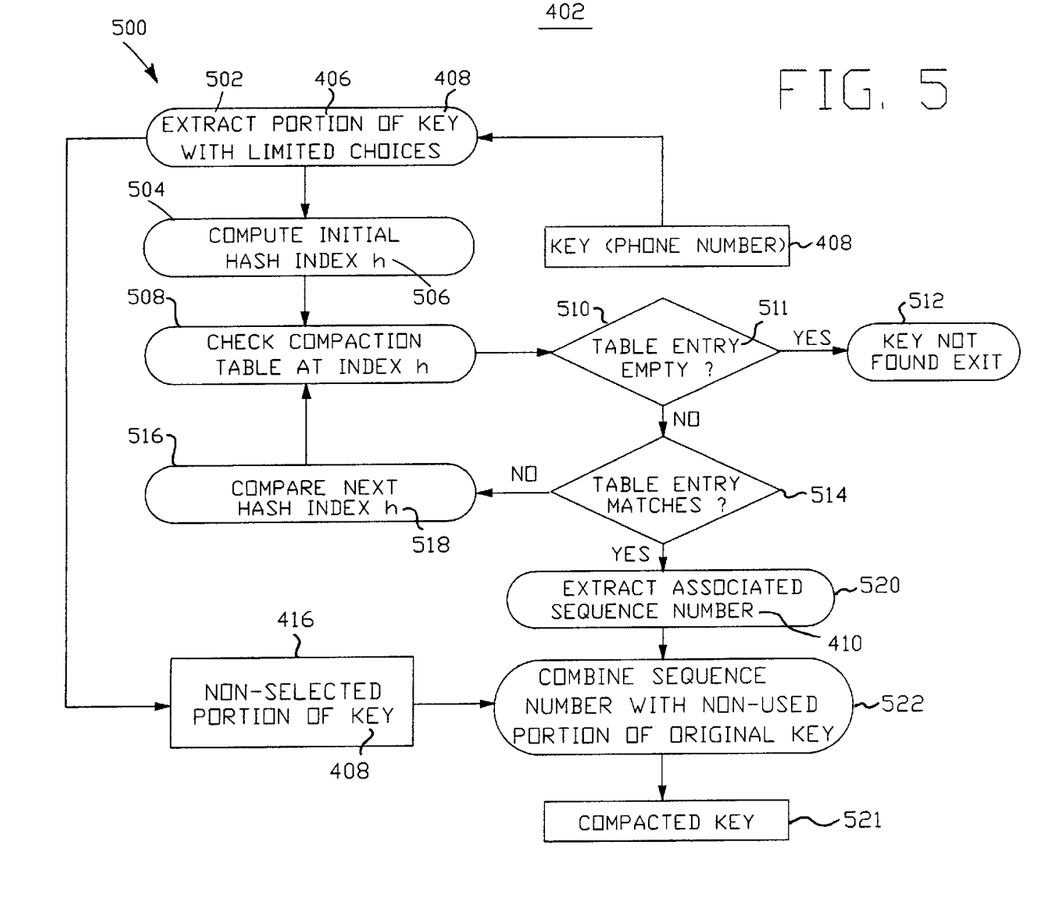
FIG. 5 depicts one example of logic employable with the first hash table of FIG. 3.

Turning to FIG. 5, in one example first stage 402 employs logic 500 in determining compact sequence number 414 of representation 410 from first portion 406 of ANI information 408. An exemplary implementation of logic 500 is presented for illustrative purposes.

Referring to FIG. 5, STEP 502 extracts first portion 406 of a key that comprises ANI information 408. In one example, STEP 502 has limited choices in selection of first portion 406. STEP 502 provides information to STEP 504. STEP 504 employs the information provided from STEP 502 in hash function 422 to compute initial hash index 506. STEP 508 receives information from STEP 504. STEP 508 employs information received to check compaction table 302 at an index. For instance, STEP 508 can check compaction table 302 at initial hash index 506 received from STEP 504. STEP 510 receives information from STEP 508. STEP 510 determines whether entry 511 in table 302 accessed at the index of STEP 508, is empty. If entry 511 is empty, then STEP 510 proceeds to STEP 512. STEP 512 concludes that first portion 406 of ANI information 408 was not found. STEP 512 can exit logic 500.

Still referring to FIG. 5, should STEP 510 determine that entry 511 in table 302 accessed at the index checked in STEP 508 is not empty, then STEP 514 determines whether entry 511 in table 302 matches first portion 406 of ANI information 408. If a match is not found, then STEP 516 employs hash function 422 to compute a next hash index 518. STEP 508 additionally receives information from STEP 516. STEP 508 can employ next hash index 518 from STEP 516 to check compaction table 302 at the next hash index 518. STEP 510 again receives information from STEP 508 and continues as described herein.

Further referring to FIG. 5, should STEP 514 determine that table entry 511 indexed at STEP 510 matches first portion 406 of ANI information 408, then STEP 514 provides information to STEP 520. STEP 520 extracts from table 302 compact sequence number 414 of representation 410. In one example of this function, STEP 520 extracts compact sequence number 414 from table 302. In this operation, compact sequence number 414 is associated with first portion 406 of ANI information 408. STEP 522 receives information from STEP 520. STEP 522 also receives information from STEP 502. STEP 502 provides second portion 416 of ANI information 408 to STEP 522. STEP 522 combines compact sequence number 414 received from STEP 520 with second portion 416 of ANI information 408 received from STEP 502, to produce compacted key 524. Compacted key 524 is employed as described herein.

Referring to FIGS. 4–5, compacted key 524, in one example, is a concatenation of compact sequence number 414 and second portion 416 of ANI information 408. Second stage 404 employs compacted key 524 for indexing table 304. Table 304 comprises, for example, a large, chained hash table with overflow capacity and optimized for speed and use of space. For instance, second stage 404 outputs GTT translation in NCP address 418, as described herein.

Returning to FIG. 4, exemplary characteristics of an illustrative example of GTT network 100 are presented for explanatory purposes. Extended service field 420 of ANI information 408 comprises eight combinations and employs three bits. Exchange 412 of ANI information 408 employs twenty bits. Second portion 416 of ANI information 408 employs fourteen bits. In one example, ANI information 408 and service-related information 420, employ thirty-seven bits. Advantageously, compaction table 302 serves to reduce service-related information 420 and ANI exchange 412 to twelve bits, with the number of exchange entries limited to 4 K, in one example. So, a compacted ANI information 408 is represented by compacted key 524 in twenty-six bits, for example.

Further referring to FIG. 4, one example of table 304 comprises a half million entries. For instance, overflow area 308 of table 304 comprises half the entries of table 304. In another example, an index for table 304 comprises eighteen bits. In one example, hash function 424 employed with table 304 employs eight bits for tag 428. For instance, hash function 424 employs a function such as "shift and exclusive or," as will be appreciated by those skilled in the art. In a further example, a chained hash link to overflow area 308 employs eighteen bits. Up to fourteen bits is employed for GTT data, in one example, so each record comprises five bytes.

Again referring to FIG. 4, based on actual data from long-distance switches such as switches 102 and 104 (FIG. 1), when table 304 is fifty-percent full, a longest chain of about three is obtained, in one example. When table 304 is seventy percent full, a longest chain of about eight is obtained, in one example. In a further example, average and worst-case look-up times are directly proportional to average and worst-case chain links. With an eight-bit tag the longest chain is, for instance, guaranteed to be not more than two hundred fifty-six, which is manageable for a worst-case look-up time, in one implementation.

Figure 6:
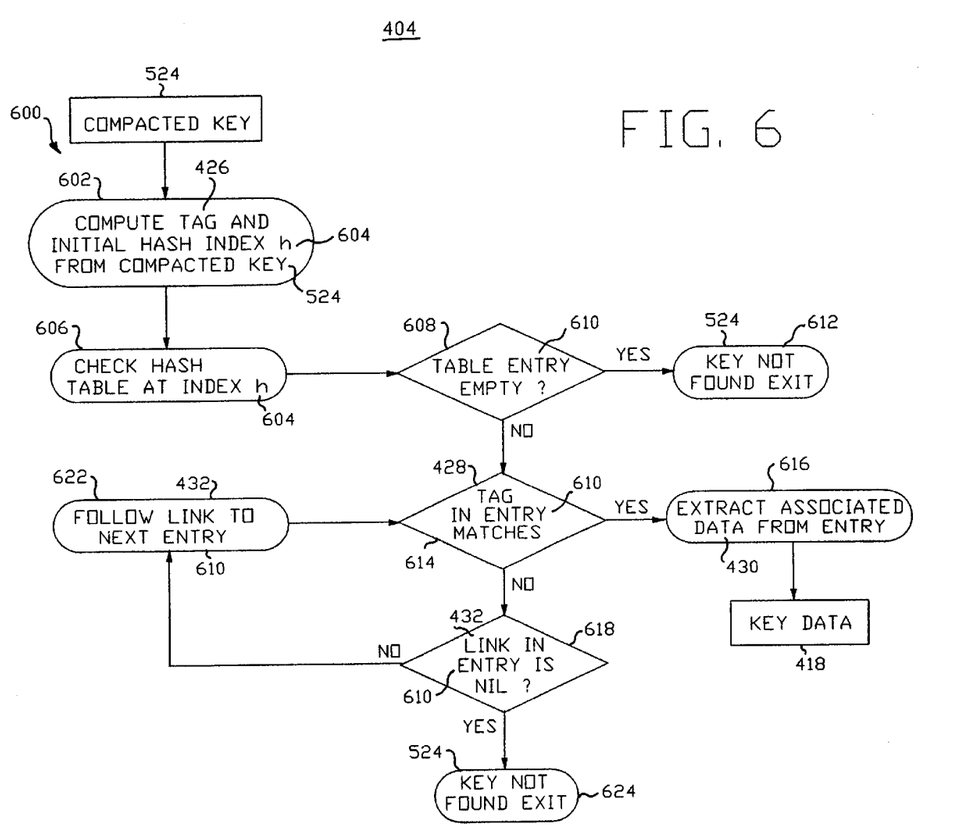
FIG. 6 depicts one example of logic employable with the second hash table of FIG. 3.

Turning to FIG. 6, one example of logic 600 employed by GTT network 100 in second stage 404 is presented for illustrative purposes.

Referring to FIG. 6, compacted key 524 is provided to STEP 602. STEP 602 employs compacted key 524 to compute tag 426 and initial hash index 604. STEP 606 receives information from STEP 602. STEP 606 checks table 304 at index 604. STEP 608 receives information from STEP 606. STEP 608 determines whether entry 610 in table 304 corresponding to index 604 received from STEP 606, is empty. If entry 610 is empty, then STEP 608 provides information to STEP 612. STEP 612 determines that compacted key 524 was not found in table 304. In addition, STEP 612 exits logic 600, in one example.

Referring still to FIG. 6, if STEP 608 determines that entry 610 corresponding to index 604 received from STEP 606 is not empty, then STEP 608 provides information to STEP 614. STEP 614 determines whether tag 426 matches tag 428 in entry 610. If there is a match, STEP 614 provides information to STEP 616. STEP 616 extracts associated data 430 from entry 610, to return NCP address 418.

Referring again to FIG. 6, if STEP 614 determines tag 426 does not match tag 428 in entry 610, then STEP 614 provides information to STEP 618. STEP 618 determines whether link 432 in entry 610 is nil. If STEP 618 determines link 432 in entry 610 is not nil, then STEP 618 provides information to STEP 622. STEP 622 follows link 432 to a next instance of entry 610. STEP 622 provides the next instance of STEP 610 to STEP 614 for continuation. In the alternative, if STEP 618 determines that link 432 in entry 610 is nil, then STEP 618 provides information to STEP 624. STEP 624 receives information from STEP 618 and concludes that compacted key 524 is not found in table 304. In addition, STEP 624 can exit logic 600.

Returning again to FIG. 4, a number of techniques may be employed to expand table 304. In one example, overflow area 308 can be expanded. For instance, a cost for expansion of overflow area 308 can comprise an additional bit per record for each doubling in size of overflow area 308. For example, a number of storage structures employed can allow such expansion to be performed on line, for instance, if memory is available. One advantage is a minimal retrofit impact, so little reloading of entries is required.

As another example, the size of table 304 can be increased. For instance, doubling the size of table 304 costs no additional bits since, in one example, the number of bits for tag 428 is decreased as the number of bits for link field 432 is increased. In addition, maximum chain length is decreased since tag 428 represents the number of entries that can hash to the same location. Increasing the size of table 304 by a factor of two, in one example, decreases by a factor of two the longest possible chain length. Other such relative factors provide analogous results.

Still referring to FIG. 4, it remains desirable to increase the initial size of table 304 and overflow area 308 without causing a problem for retrofit, such as by avoidance of reloading of all values in table 304. It also remains desirable to perform such expansion on line. An additional technique of the invention is directed to providing such advantageous features, as further discussed below.

Figure 7:
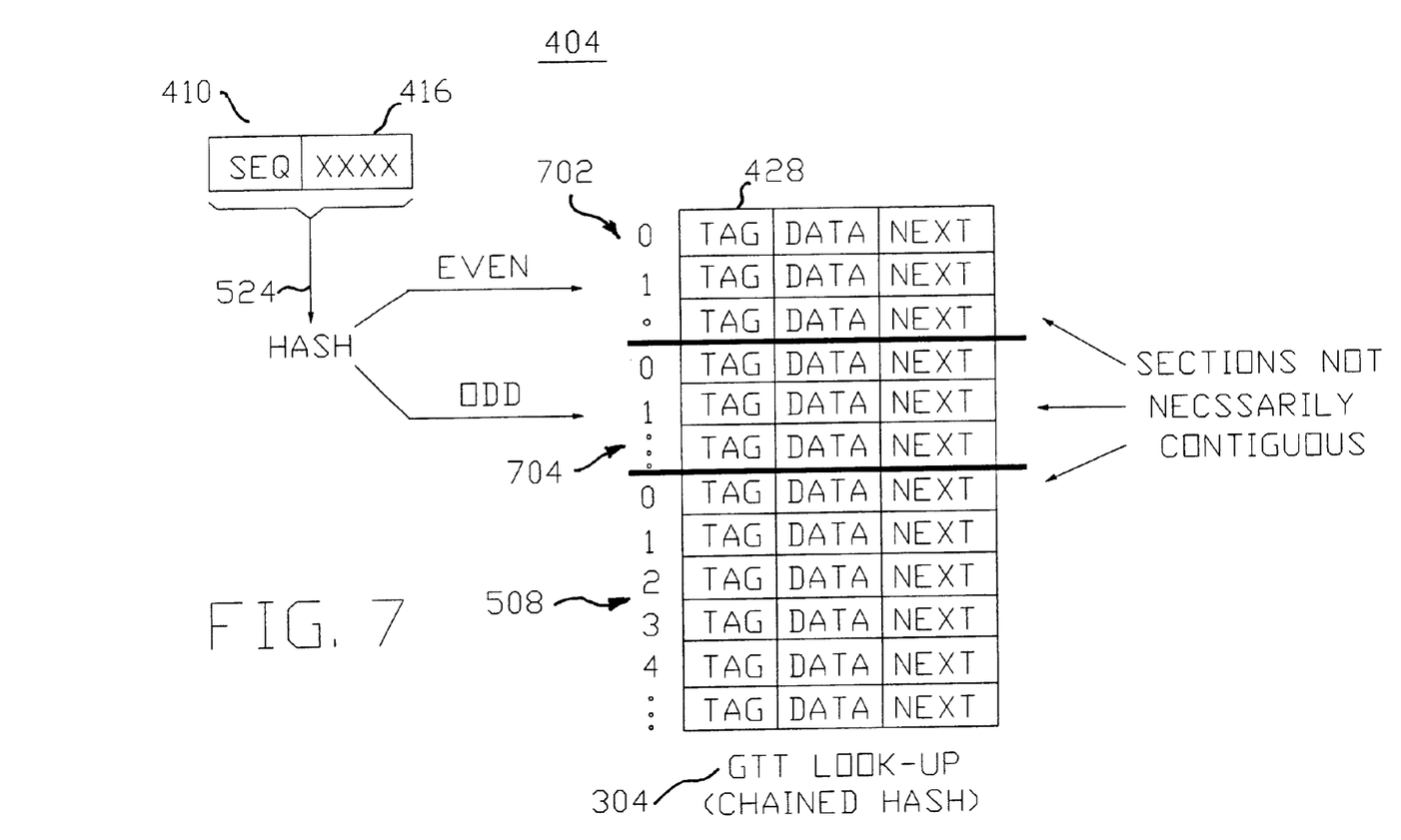
FIG. 7 depicts another example of the second hash table of FIG. 3.

Turning to FIG. 7, one technique doubles the initial hash area by creating a plurality of tables in place of one table, as table 304. For instance, the technique creates first sub-table 702 and second sub-table 704. In one example, one of the tag bits is used to determine which table of sub-tables 702 and 704 to use for the look-up employed in second stage 404. For example, the tag bit employed comprises the least significant bit, which is more random, as will be appreciated by those skilled in the art. Overflow area 308 is common to both first sub-table 702 and second sub-table 704. The size of overflow area 308 can be independently increased in size. Entries in table 304 of FIG. 7 can be exactly the same as entries in table 304 of FIG. 4, in one example. Tag 428 can be filly maintained in table 304 of FIG. 7 even though one of the bits is no longer needed, in one example. Advantageously, the technique of FIG. 7 allows the split to be performed on line with selection of an appropriate algorithm. Furthermore, sub-tables 702 and 704 desirably need not even be contiguous. This serves to avoid problems with memory allocation.

Still referring to FIG. 7, table 304, in one example, is split into a plurality of areas or sub-tables, as described herein. For instance, table 304 can be split into first sub-table 702, second sub-table 704, and overflow area 308. Each chain is examined, moving all entries whose tags comprise an odd value to second sub-table 704, or leaving those entries in overflow area 308. The moved entries are copied and next pointers are adjusted, to maintain separate chains for odd and even tags. Since the chains are relatively short, relatively small blocks of chains can be processed at once, for example, if done during off-peak hours. The search algorithm executes in three phases. Initially, searches look in the initial hash area comprising first sub-table 702. So, upon the start of the splitting process, the search first checks the first sub-table 702, the initial hash area, and then, if necessary, second sub-table 704. First table 702 may be referred to as the "even" sub-table, and second sub-table 704 may be referred to as the "odd" sub-table. After completion of the splitting, the tag can be used immediately to select first sub-table 702 or second sub-table 704, to speed the look-up process, as will be appreciated by those skilled in the art.

Referring again to FIG. 7, this technique of table-splitting, in one example, employs no extra bits. The unused tag bit can be reclaimed if the record structure is modified and table 304 is reloaded. This bit can then be used to double overflow area 308. Searches can require the same look-up time, until the splitting technique completes, at which time chains become shorter since the correct one of sub-tables 702 and 704 is used to begin the search. Maximum chain length is also halved. The whole operation can be performed on line, including provisioning operations. Second sub-table 704 can be allocated anywhere in memory, which eliminates the previous need to reallocate and move code and tables with the doubling of the table size. In addition, the odd/even technique can be applied again using another bit from the tag field.

As described herein, one example of the present invention provides an improved approach for GTT database storage and access for use in a telecommunication network. A relatively large quantity of records can be stored in a relatively small amount of space while providing fast access for both look-ups and provisioning. Design choices allow numerous advantages to be provided, in various implementations. Exemplary possibilities include the following. Relatively large quantities of phone numbers can be stored in a substantially limited amount of space. Fast average look-up can be accomplished using a few probes. A worst-case look-up time can be decreased with increasing size of the initial hash area. Fast insert and delete can be provided in times comparable to look-up times. Table size can be increased without increasing the record size, such as by doubling table as well as overflow areas. Overflow area can be expanded for providing an on-line increase of table size. Even/odd sub-tables can be employed to allow for on-line expansion.

Although preferred embodiments have been depicted and described in detail herein, it will be apparent to those skilled in the relevant art that various modifications, additions, substitutions and the like can be made without departing from the spirit of the invention and these are therefore considered to be the within the scope of the invention as defined in the following claims.

What is claimed is:

1. A method for determining from automated number identification information a network control point address that stores information related to call handling, the method comprising the steps of:

determining from a first portion of the automated number identification information a representation having a decreased size relative to the first portion; and employing the representation with a second portion of the automated number identification information to determine the network control point address.

2. The method of claim 1 wherein the step of determining from the first portion of the automated number identification information the representation having the decreased size relative to the first portion comprises the step of employing a table to determine the representation from the first portion of the automated number identification information.

3. The method of claim 2 wherein the table comprises a first table and wherein the step of employing the representation with the second portion of the automated number identification information to determine the network control point address comprises the step of employing a second table different from the first table to determine the network control point address from the representation with the second portion of the automated number identification information.

4. The method of claim 3 wherein the step of determining from the first portion of the automated number identification information, the representation having the decreased size relative to the first portion and the step of employing the representation with the second portion of the automated number identification information to determine the network control point address comprise the step of selecting at least one of the first table and the second table to comprise a look-up table.

5. The method of claim 1 wherein the step of determining from the first portion of the automated number identification information the representation having the decreased size relative to the first portion comprises the step of selecting the first portion of the automated number identification information to comprise exchange information of the automated number identification information.

6. The method of claim 5 wherein the step of determining from the first portion of the automated number identification information the representation having the decreased size relative to the first portion comprises the step of selecting the first portion of the automated number identification information to comprise the exchange information of the automated number identification information and service-related information of the automated number identification information.

7. The method of claim 6 wherein the step of determining from the first portion of the automated number identification information the representation having the decreased size relative to the first portion comprises the step of selecting the service-related information to comprise an association with the exchange information.

8. The method of claim 1 wherein the step of determining from the first portion of the automated number identification information the representation having the decreased size relative to the first portion comprises the step of converting exchange information of the automated number identification information into a compact representation.

9. The method of claim 8 wherein the step of determining from the first portion of the automated number identification information the representation having the decreased size relative to the first portion comprises the step of converting the exchange information and service-related information of the automated number identification information into the compact representation.

10. The method of claim 8 wherein the step of employing the representation with the second portion of the automated number identification information to determine the network control point address comprises the step of employing the compact representation with the second portion of the automated number identification information to determine the network control point address.

11. The method of claim 1 wherein the step of determining from the first portion of the automated number identification information the representation having the decreased size relative to the first portion comprises the step of determining from the first portion of the automated number identification information a compact number having a decreased storage size relative to the first portion.

12. The method of claim 11 wherein the step of employing the representation with the second portion of the automated number identification information to determine the network control point address comprises the step of employing the compact number with the second portion of the automated number identification information to determine the network control point address.

13. The method of claim 1 wherein the step of determining from the first portion of the automated number identification information the representation having the decreased size relative to the first portion comprises the step of employing a hash function to determine from the first portion of the automated number identification information the representation having the decreased size relative to the first portion.

14. The method of claim 1 wherein the step of determining from the first portion of the automated number identification information the representation having the decreased size relative to the first portion comprises the step of determining the representation by searching in a table for a match with a part of the automated number identification information.

15. The method of claim 14 wherein the step of determining the representation by searching in the table for the match with the part of the automated number identification information comprises the step of determining the representation by searching in the table for a match with the first portion of the automated number identification information.

16. The method of claim 14 wherein the step of determining the representation by searching in the table for the match with the part of the automated number identification information comprises the step of determining the representation by searching in the table for a match with exchange information of the automated number identification information.

17. The method of claim 16 wherein the step of determining the representation by searching in the table for the match with the part of the automated number identification information comprises the step of determining the representation by searching in the table for a match with the exchange information of the automated number identification information and service-related information of the automated number identification information.

18. The method of claim 1 wherein the step of determining from the first portion of the automated number identification information the representation having the decreased size relative to the first portion comprises the step of employing a table to determine a correspondence between the first portion of the automated number identification information and the representation.

19. The method of claim 1 wherein the step of employing the representation with the second portion of the automated number identification information to determine the network control point address comprises the step of employing the representation with the second portion of the automated number identification information to access a table that provides the network control point address.

20. The method of claim 19 wherein the step of employing the representation with the second portion of the automated number identification information to access the table that provides the network control point address comprises the step of selecting the table to comprise a chained hash table.

21. The method of claim 19 wherein the step of employing the representation with the second portion of the automated number identification information to access the table that provides the network control point address comprises the step of selecting the table to have overflow capacity.

22. The method of claim 1 wherein the step of employing the representation with the second portion of the automated number identification information to determine the network control point address comprises the step of employing the representation with the second portion of the automated number identification information to access a plurality of tables to determine the network control point address.

23. The method of claim 22 wherein the step of employing the representation with the second portion of the automated number identification information to determine the network control point address comprises the step of selecting the plurality of tables to comprise a first table non-contiguous with a second table of the plurality of tables in the step of employing the representation with the second portion of the automated number identification information to access the first table and the second table to determine the network control point address.

24. The method of claim 22 wherein the step of determining from the first portion of the automated number identification information the representation having the decreased size relative to the first portion and the step of employing the representation with the second portion of the automated number identification information to determine the network control point address comprise the step of allocating the plurality of tables.

25. The method of claim 22 wherein the step of determining from the first portion of the automated number identification information the representation having the decreased size relative to the first portion and the step of employing the representation with the second portion of the automated number identification information to determine the network control point address comprised the step of provisioning the plurality of tables.

26. The method of claim 1 wherein the step of employing the representation with the second portion of the automated number identification information to determine the network control point address comprises the step of employing table-splitting to determine the network control point address.

27. A system for determining from automated number identification information a network control point address that stores information relating to call handling, the system comprising:
a first stage component that determines from a first portion of the automated number identification information a representation having a decreased size relative to the first portion; and
a second stage component that employs the representation with the second portion of the automated number identification information to determine the network control point address.

28. The system of claim 27 wherein the first stage employs a table to determine the representation from the first portion of the automated number identification information.

29. The system of claim 28 wherein the table comprises a first table, and wherein the second stage component employs a second table different from the first table to determine the network control point address from the representation with the second portion of the automated number identification information.

30. The system of claim 29 wherein at least one of the first table and the second table comprises a look-up table.

31. The system of claim 27 wherein the first portion of the automated number identification information comprises exchange information of the automated number identification information.

32. The system of claim 31 wherein the first portion of the automated number identification information comprises the exchange information of the automated number identification information and service-related information of the automated number identification information.

33. The system of claim 32 wherein the service-related information comprises an association with the exchange information.

34. The system of claim 27 wherein the first portion of the automated number identification information comprises exchange information of the automated number identification information, wherein the representation comprises a compact representation, and wherein the first stage component converts the exchange information of the automated number identification information into the compact representation.

35. The system of claim 34 wherein the first stage component converts the exchange information and service-related information of the automated number identification information into the compact representation.

36. The system of claim 34 wherein the second stage component employs the compact representation with the second portion of the automated number identification information to determine the network control point address.

37. The system of claim 27 wherein the representation comprises a compact number having a decreased storage size relative to the first portion of the automated number identification information, and wherein the first stage component determines the compact number from the first portion.

38. The system of claim 37 wherein the second stage component employs the compact number with the second portion of the automated number identification information to determine the network control point address.

39. The system of claim 27 wherein the first stage component employs a hash function to determine from the first portion of the automated number identification information the representation having the decreased size relative to the first portion.

40. The system of claim 27 wherein the first stage component determines the representation by searching in a table for a match with a part of the automated number identification information.

41. The system of claim 40 wherein the part of the automated number identification information comprises the first portion of the automated number identification information.

42. The system of claim 40 wherein the part of the automated number identification information comprises exchange information of the automated number identification information.

43. The system of claim 42 wherein the part of the automated number identification information comprises the exchange information of the automated number identification information and service-related information of the automated number identification information.

44. The system of claim 27 wherein the first stage component employs a table to determine a correspondence between the first portion of the automated number identification information and the representation.

45. The system of claim 27 wherein the second stage component employs the representation with the second portion of the automated number identification information to access a table that provides the network control point address.

46. The system of claim 45 wherein the table comprises a chained hash table.

47. The system of claim 45 wherein the table has overflow capacity.

48. The system of claim 27 wherein the second stage component employs the representation with the second portion of automated number identification information to access a plurality of tables to determine the network control point address.

49. The system of claim 48 wherein the plurality of tables comprise a first table non-contiguous with a second table of the plurality of tables, and wherein the second stage component employs the representation with the second portion of the automated number identification information to access the first table and the second table to determine the network control point address.

50. The system of claim 48 wherein the second stage component allocates the plurality of tables.

51. The system of claim 48 wherein the second stage component provisions the plurality of tables.

52. The system of claim 27 wherein the second stage component employs table-splitting to determine the network control point address.

* * * * *

UNITED STATES PATENT AND TRADEMARK OFFICE
CERTIFICATE OF CORRECTION

PATENT NO.    : 6,389,123 B1                                         Page 1 of 1
DATED         : May 14, 2002
INVENTOR(S)   : Hung et al.

It is certified that error appears in the above-identified patent and that said Letters Patent is hereby corrected as shown below:

Drawings,
Please delete the drawing sheet 6 of 6 and substitute therefor the following drawing sheet:

Signed and Sealed this

Thirtieth Day of July, 2002

Attest:

JAMES E. ROGAN
Attesting Officer         Director of the United States Patent and Trademark Office